July 28, 1925.
G. L. DAVIS
1,547,413
EXHAUST DEFLECTOR FOR MUFFLERS
Filed Oct. 21, 1924
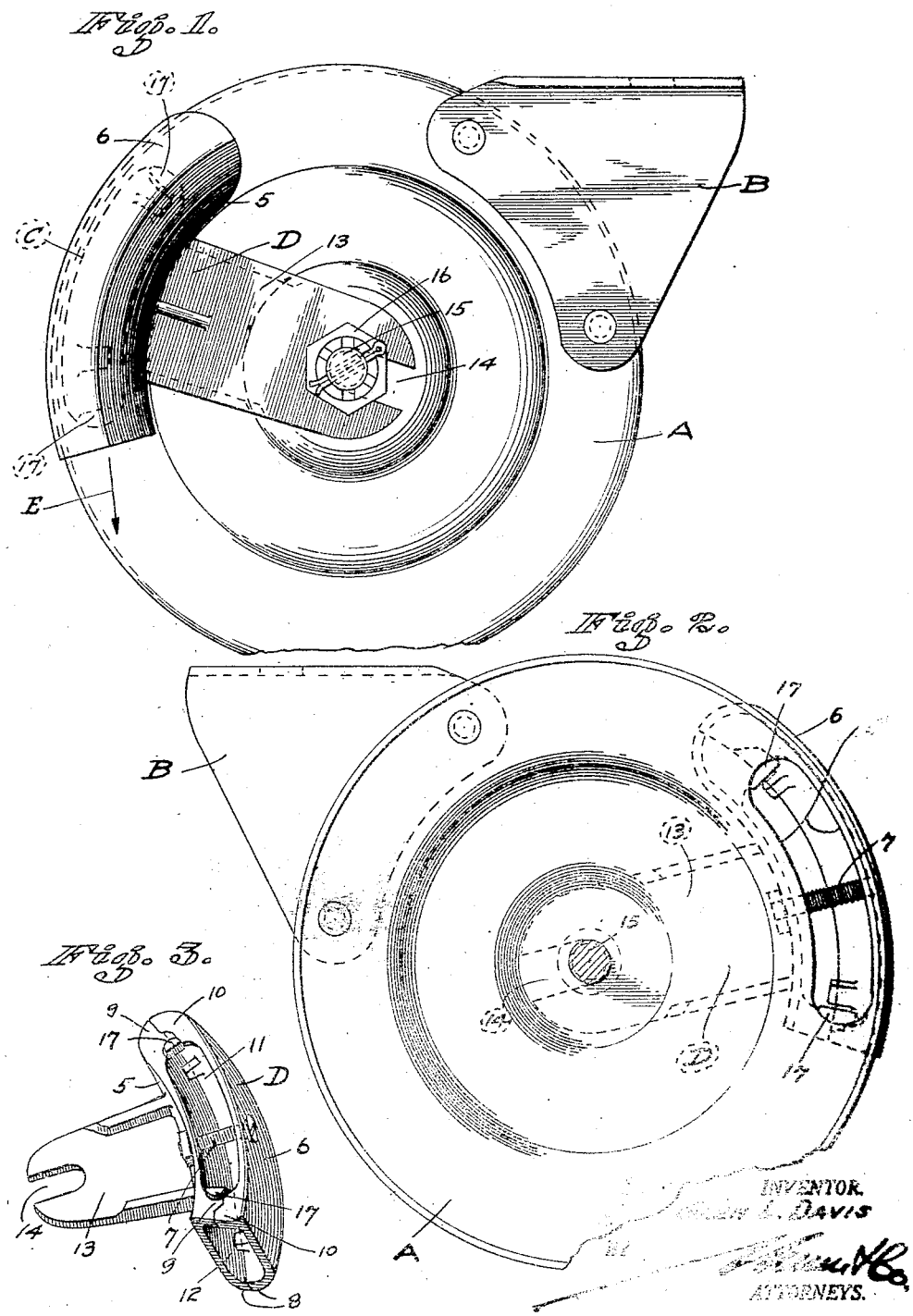
INVENTOR.
G. L. DAVIS
ATTORNEYS.

Patented July 28, 1925.

1,547,413

UNITED STATES PATENT OFFICE.

GLEN L. DAVIS, OF SAN FRANCISCO, CALIFORNIA.

EXHAUST DEFLECTOR FOR MUFFLERS.

Application filed October 21, 1924. Serial No. 744,975.

*To all whom it may concern:*

Be it known that I, GLEN L. DAVIS, a citizen of the United States, and a resident of San Francisco, county of San Francisco, State of California, have invented a new and useful Exhaust Deflector for Mufflers, of which the following is a specification.

This invention relates to gas deflectors for the mufflers of power plants, and is more particularly directed to deflectors for use in connection with engine mufflers of what are commercially known as Ford automobiles.

In mufflers of the above described character, no provision is made for deflecting the gas in a direction that will prevent it from discharging against what are commonly referred to as the "spare tire" at the rear of the automobile, and in consequence thereof, the tire is frequently damaged, scorched and made subject to premature deterioration incident to the action of the gas and its attendant heat.

It is an object of my invention to overcome these aforementioned objections in existing devices of this nature and cause the gas to be deflected to a point wherein elements therein will do no harm to the tire or other parts of the automobile, such as the casing and cover of the tire.

It is an essential object of my invention that a device of this character be formed and designed whereby it can be quickly attached to the muffler, and which will consist of coacting parts that can be manufactured at small cost and at the same time be entirely effective for the purpose intended.

Another object of the invention is to provide a device of this character having novel means for locking it against incidental loss from the muffler.

Another object of the invention is to provide a device of this character that can be applied to the muffler without requiring any alterations in the construction thereof.

Other features of novelty and utility will obviously appear upon reference to the accompanying drawings and description, wherein:

Figure 1 is a view in rear elevation of a muffler showing an application of my invention thereto;

Figure 2 is an elevational view looking in the direction of the inside of the rear head of the muffler so as to illustrate the manner of locking the invention against incidental loss while establishing communication between the nozzle of the invention and the discharge opening of the muffler; and Figure 3 is a perspective view of the invention detached from the muffler head.

A indicates the rear head of a muffler, and B the customary supporting bracket carried by the head adapted to be secured in the usual manner to the frame of an automobile so that the barrel of the muffler extends longitudinally with respect to the frame. Near one margin of the head A is a relatively long arcuate opening C from which the exhaust gases ordinarily escape on a straight horizontal line from the muffler.

D generally illustrates my invention, which I specifically term a gas deflector. It consists of two mating sections 5 and 6 arranged back to back and joined together by means of a machine screw 7. The two sections are curved in their length, and same are disposed in concentric relation to the rear head A of the muffler, as clearly shown in Figure 1. The combined width of the two sections is calculated with respect to the width of the exhaust opening C so that the sides of the opening are overlapped by the respective sides of the sections 5 and 6. The ends of the sections 5 and 6 project slightly beyond the respective ends of said exhaust opening C.

The two sections 5 and 6 are spaced apart by flanges 8—8 and spacing lugs 9 on the section 5 and similar lugs 10 on the section 6. These sections are otherwise formed to define a lateral opening 11 and a discharge opening 12, the latter, incident to the curvatures given the respective sections 5 and 6, being arranged to discharge the gas substantially at an angle of about 45 degrees to the normal opening C of the muffler.

The opening 12 coincides with the discharge opening C of the muffler, and instead of the gases passing on a direct horizontal line as heretofore experienced, the gases are first taken into the opening 11 and finally discharged from the opening 12 at the angle just mentioned. In this manner of discharging the gas from the muffler, same is deflected along the line indicated by the arrow E in Figure 1, where it finally passes directly to the ground.

In this manner it manifestly follows that instead of subjecting the spare tire to a constant blast of discharging gas from the muffler, this gas is deflected to a point where it in no way is permitted to touch the tire.

The two sections 5 and 6, incident to their respective characterizing features, constitute a nozzle or duct having a lateral opening which registers with the normal opening C of the muffler and a base or discharge opening C which conveys the gas downward instead of horizontally as heretofore in mufflers of this type.

In order that the device can be attached to a muffler of standard form, I provide the section 5 with a bifurcated bracket 13 whose bifurcation 14 is adapted to receive the customary tie bolt 15. This tie bolt carries a lock nut 16 which may be advanced against the bracket 13 to hold it suspended. In order to prevent the device from creeping circumferentially around the head of the muffler, and with a view to maintaining constant registration of the opening 11 with the said opening C, I provide the section 5 with end lugs 17 which engage against the respective end walls of the opening C.

The device as above outlined is simple and effective. It can be manufactured at small cost and its parts assembled with dispatch. It can be connected with a muffler of the aforesaid type without requiring any changes in the construction thereof. When applied, it serves to convert the normal course of the discharging gas so that it may be taken toward the ground line instead of being brought into direct impingement with the spare tire at the rear of an automobile.

I claim:

1. A device of the class described comprising a hollow member formed of sections provided with mating portions constituting a nozzle, means securing the sections together, and means for attaching the member against the discharge opening of a muffler, said attaching means comprising a bifurcated shank on the member, and a bolt adapted to be passed through the bifurcation and engaged with the muffler.

2. A device of the class described comprising a hollow member formed of sections provided with mating portions constituting a nozzle, means securing the sections together, and means for attaching the member against the discharge opening of a muffler, said attaching means comprising a shank or member, a bolt adapted to secure the shank to the muffler, and lugs on one of said sections adapted to engage with the walls of the muffler opening to hold the member against turning on the bolt.

GLEN L. DAVIS.